US010619873B2

(12) United States Patent
Mönkkönen et al.

(10) Patent No.: US 10,619,873 B2
(45) Date of Patent: Apr. 14, 2020

(54) INTELLIGENT VENTILATION SYSTEM (71) Applicant: Air D Fin Oy, Helsinki (FI)

(72) Inventors: Simo Mönkkönen, Helsinki (FI); Artur Glad, Helsinki (FI)

(73) Assignee: Air D Fin Oy, Helsinki (FI)

( * ) Notice: Subject to any disclaimer, the term of this patent is extended or adjusted under 35 U.S.C. 154(b) by 266 days.

(21) Appl. No.: 15/558,625

(22) PCT Filed: Mar. 10, 2016

(86) PCT No.: PCT/FI2016/050145
§ 371 (c)(1),
(2) Date: Sep. 15, 2017

(87) PCT Pub. No.: WO2016/146885
PCT Pub. Date: Sep. 22, 2016

(65) Prior Publication Data
US 2018/0087791 A1 Mar. 29, 2018

(30) Foreign Application Priority Data
Mar. 16, 2015 (FI) ..................... 20155174

(51) Int. Cl.
*F24C 15/20* (2006.01)
*F24F 11/00* (2018.01)
(Continued)

(52) U.S. Cl.
CPC .......... *F24F 11/0001* (2013.01); *F24F 11/30* (2018.01); *F24F 13/08* (2013.01);
(Continued)

(58) Field of Classification Search
CPC ................................................. F24C 15/2021
(Continued)

(56) References Cited

U.S. PATENT DOCUMENTS

2004/0023614 A1* 2/2004 Koplin ..................... G06F 1/18
454/184
2007/0243820 A1 10/2007 O'Hagin
(Continued)

FOREIGN PATENT DOCUMENTS

CA 2717981 A1 1/2012
EP 2096366 A2 9/2009
WO 03025469 A1 3/2003

OTHER PUBLICATIONS

"Extract air diffuser for the WISE system", Adapt Extract, Swegon Oy, Oikeus rakennemuutoksiin pidätetään, May 3, 2015, 10 pages including 5 pages of machine English translation.
(Continued)

*Primary Examiner* — Vivek K Shirsat
*Assistant Examiner* — Ko-Wei Lin
(74) *Attorney, Agent, or Firm* — Ziegler IP Law Group, LLC (57) ABSTRACT An additional part to be located in an air vent and an air vent for a ventilation system including a number of elements, which air vent lets air enter the ventilation system and/or move away from the ventilation system. The additional part of the air vent includes one or several sensors measuring parameters related to air quality, a data transfer interface for implementing data transfer between the air vent and other elements of the ventilation system, and a processing unit which is automatically configured to determine changes needed in the settings of the ventilation system on the basis of parameters measured by the sensors and send information on the changes needed in the other elements of the ventilation system through the data transfer interface.

19 Claims, 5 Drawing Sheets (51) Int. Cl.
*F24F 13/08* (2006.01)
*F24F 11/30* (2018.01)
*F24F 110/50* (2018.01)
*F24F 110/70* (2018.01)
*F24F 11/56* (2018.01)

(52) U.S. Cl.
CPC ........... *F24F 11/56* (2018.01); *F24F 2110/50* (2018.01); *F24F 2110/70* (2018.01)

(58) Field of Classification Search
USPC .................................. 454/340–342, 357, 229
See application file for complete search history.

(56) References Cited

U.S. PATENT DOCUMENTS

| | | | |
|---|---|---|---|
| 2008/0182506 A1* | 7/2008 | Jackson | F24F 11/30 454/354 |
| 2011/0284091 A1* | 11/2011 | Livchak | F24C 15/2021 137/2 |
| 2013/0190931 A1 | 7/2013 | Secor | |
| 2014/0188286 A1 | 7/2014 | Hunka | |
| 2015/0032264 A1 | 1/2015 | Emmons et al. | |
| 2015/0211749 A1* | 7/2015 | Robison | F24C 15/2021 454/340 |

OTHER PUBLICATIONS

"Tarpeenmukainen ilmanvaihto", Yleiskuvaus, Swegon Oy, Feb. 20, 2010, 27 pages including 11 pages of machine English translation.

Office Action received for Finnish patent application No. 20155174, dated Dec. 17, 2018, 13 pages including 8 pages of machine English translation.

Third Party Observation Filed for Finnish Patent Application No. 20155174, dated Dec. 17, 2018, 8 pages including 3 pages of machine English translation.

International Preliminary Report on Patentability and Written Opinion received for International Patent Application No. PCT/FI2016/050145, dated Sep. 19, 2017, 6 pages.

Finland Search Report, Application No. 20155174, dated Oct. 21, 2015, 1 page.

The International Search Report and Written Opinion of the International Searching Authority, Application No. PCT/FI2016/050145, dated Jul. 20, 2016, 11 pages.

* cited by examiner

INTELLIGENT VENTILATION SYSTEM

FIELD

The present disclosure is generally related to ventilation systems and the adjustment of ventilation systems.

BACKGROUND

Putting it simply, a ventilation system of a building comprises a ventilation unit, air vents, and ducts combining the ventilation unit and the air vents. Air vents include, for example, air intake and air exhaust valves. The amount and quality of air passing through the air intake and air exhaust valves of ventilation systems may be measured by means of separate measurement devices or sensors, which are placed in the ducts, for example. On the basis of the measurement results of separate measurement devices, the air intake and air exhaust valves may be adjusted to exchange the air in accordance with the needs of the space in question.

US2013190931 presents a solution where environmental parameters related to a ventilation system are measured and information on them is sent wirelessly to a display device. This reduces the need for a mechanic to move back and forth between the measurement point and the location where the ventilation system is adjusted.

EP2096366 presents motorized ventilation terminal equipment where a motor is controlled by a sensor measuring the speed of the air current. The benefit of the system has been stated to be in the fact that it does not need data transfer or system integration.

SUMMARY

A first aspect of the disclosed embodiments provide an additional part for an air vent. Such air vent is part of a ventilation system comprising a number of elements, and lets air into the ventilation system and/or away from the ventilation system. The air vent is, for example, an air intake or air exhaust valve. The additional part of the air vent comprises:
- one or several sensors measuring parameters related to the quality of air,
- a data transfer interface to implement data transfer between said additional part or air vent and the other elements of said ventilation system, and
- a processing unit, which is configured to automatically determine any changes needed in the settings of said ventilation system based on parameters measured by said sensors and send information on said changes needed in the other elements of said ventilation system through said data transfer interface.

In an embodiment, the air vent is an air exhaust valve. In an embodiment, the additional part is configured to be detachably attached to said air vent.

In an embodiment, the sensors in the air exhaust valve are configured to measure quality of the air exiting a ventilated space. In an embodiment, the sensors comprise a sensor measuring the carbon dioxide content of the air exiting a ventilated space.

In an embodiment, the processing unit is configured to determine, on the basis of the quality of air exiting the ventilated space, any changes needed in air intake valves of the ventilated space.

In an embodiment, the processing unit is configured to determine, on the basis of the quality of air exiting the ventilated space, any changes needed in air intake valves of the ventilated space and any changes needed in the air exhaust valve.

In an embodiment, the processing unit is configured to determine, on the basis of the quality of air exiting said ventilated space, any changes needed in air intake valves of said ventilated space and any changes needed in air intake valves of other ventilated spaces, thereby enabling changes in ventilation of said ventilation system without making changes in a ventilation unit of said ventilation system.

In an embodiment, any changes determined comprise changes to the settings of a ventilation unit belonging to the ventilation system and/or the settings of other air vents of the ventilation system.

In an embodiment, the processing unit is configured to automatically control the operation of said ventilation unit and other air vents on the basis of the determined changes.

In an embodiment, the processing unit is additionally configured to automatically determine any changes needed in the settings of said air vent on the basis of parameters measured by said sensors and perform the specified changes to the settings of said air vent.

In an embodiment, the processing unit is configured to receive setting information through said data transfer interface for said air vent and change the settings of said air vent on the basis of said received setting information.

In an embodiment, sensors measuring parameters related to the quality of air comprise at least one of the following: a sensor measuring the carbon dioxide content of the air and a sensor measuring the fine particle content of the air.

In an embodiment, the air vent comprises a decorative part to be attached to an outer surface of the air vent.

In an embodiment, the air vent comprises a light fitting to be attached to an outer surface of the air vent.

In an embodiment, the processing unit is configured to receive setting information for said light fitting through said data transfer interface and control said light fitting on the basis of said received setting information.

In an embodiment, there is provided an air vent which comprises an additional part in accordance with the first aspect.

A second aspect of the disclosed embodiments provide a ventilation system, which comprises air intake valves and air exhaust valves. The ventilation system comprises an air exhaust valve that comprises one or several sensors measuring parameters related to quality of air located in said air exhaust valve, and the ventilation system comprises a processing unit which is configured to automatically determine any changes needed in the settings of the different elements of said ventilation system on the basis of parameters measured by said sensors and automatically control said ventilation system to introduce said changes needed. The processing unit particularly determines settings for at least one element of the ventilation system separate of said air exhaust valve, such as a ventilation unit or another air vent.

In an embodiment, the sensors in the air exhaust valve are configured to measure quality of the air exiting a ventilated space, and the processing unit is configured to determine, on the basis of the quality of air exiting the ventilated space, any changes needed in air intake valves of the ventilated space.

In an embodiment, the processing unit is configured to provide the user with a user interface through which the user may in a centralized manner change the settings of the different elements of said ventilation system.

A third aspect of the disclosed embodiments provide a method for a ventilation system characterized in that in the method comprises:

measuring parameters related to the quality of air by sensors located in an air vent, automatically determining changes needed in the settings of the different elements of said ventilation system on the basis of parameters measured by said sensors, and automatically introducing said changes needed in said ventilation system.

In an embodiment, the air vent is an air exhaust valve and the sensors measure the quality of air exiting a ventilated space.

In an embodiment, the method further comprises automatically determining, on the basis of the quality of air exiting the ventilated space, any changes needed in air intake valves of the ventilated space.

In an embodiment, the method further comprises automatically determining, on the basis of the quality of air exiting the ventilated space, any changes needed in air intake valves of said ventilated space and any changes needed in air intake valves of other ventilated spaces, thereby enabling changes in ventilation of said ventilation system without making changes in a ventilation unit of said ventilation system.

In an embodiment, a user is additionally provided with a user interface through which the user may in a centralized manner change the settings of the different elements of said ventilation system.

Here it is to be noted that it is also possible to combine embodiments presented in connection with different aspects to other aspects of the invention. In addition, the characteristics of different embodiments may be combined with each other in any suitable manner.

BRIEF DESCRIPTION OF THE DRAWINGS

The disclosed embodiments will be described in the following by way of example with reference to the appended drawings, wherein.

DETAILED DESCRIPTION

In the figures, the same reference numbers have been used for corresponding elements.

Solutions typically used in ventilation systems have been known for a long time and are well established. The essential parts of ventilation systems have not been changed for a number of years. Now it has been observed that there is a need to develop ventilation systems to be more flexible and more user-friendly as a whole.

In an embodiment of the present disclosure, a new solution is provided for measuring and changing the quality and amount of ventilation in private and/or public buildings. The object of an embodiment of the invention is an additional part to be installed in an air vent/ventilation valve of a ventilation system in private and public buildings and/or an air vent comprising the characteristics of such an additional part. In an embodiment of the invention there is provided an additional part to be placed in an air vent or an air vent that replace separate air quality and amount detection devices by combining the detection of parameters related to the quality of air as part of the ventilation system. An intelligent ventilation system according to an embodiment senses air quality and air amount characteristics with sensors located in the air vent from the air intake and air exhaust. This may be performed in real time. In an intelligent ventilation system according to an embodiment, it is possible to adjust the amount of air intake and air exhaust in real time. By means of an additional part of an air vent in accordance with various embodiments, it is possible to make existing air vents to be part of an intelligent ventilation system.

In an embodiment an additional part is placed in an air exhaust valve. The additional part comprises sensors measuring parameters related to the quality of air. By being placed in an air exhaust valve, the sensors of the additional part monitor the quality of air that exits the ventilated space instead of only monitoring the air that enters the space. In an embodiment the measurements made in an air exhaust valve are used for determining settings for air intake valve(s) of the space. In this way it is possible to adjust the ventilation and air intake of the space based on the quality of air that exits the space. It is to be noted that in any embodiment, there may be an additional part and sensors in the air intake valve, too. Further, the measurements made in air exhaust valve and/or air intake valve may also be used for determining settings for the air exhaust valve and further also for determining settings for air intake and air exhaust valve(s) in other spaces of the ventilated system in question.

In ventilation systems according to prior art, it is difficult to monitor the amount and quality of indoor air in real time and adjust it according to need. A number of known ventilation systems require, for example, that the amount and quality of air is measured by some external or separate means and, based on the results received, the maintenance man may perform changes to the adjustments of the ventilation unit. Performing such adjustments continuously is not sensible or even possible. The goal of certain embodiments of the present disclosure is to make this easier and more user-friendly.

In an embodiment of the present disclosure, it is possible, among other things, to monitor the quality and amount of air in real time on a computer and/or some other electronic device or intelligent device. For example, the air quality and air amount in every room of an individual apartment or a public/business building may be monitored and adjusted separately. Intelligent air vent/valve in accordance with an embodiment of the invention or an additional part located therein is connected to the ventilation unit, and the air vent or their additional part is configured to adjust the amount of air according to need on the basis of the measurement results produced by sensors located in the air vent. The air vent may be connected to a ventilation unit and/or other elements of a ventilation system directly or indirectly through some intermediate element or device. The air vent may be connected to a ventilation unit through a data transfer connection, for example. The data transfer connection may be wireless or fixed. The data transfer connection may be, for example, a short-range connection, such as Bluetooth, an infrared or an NFC connection, or an information network, mobile data network, or data cable connection. The data transfer connection may be a connection in accordance with the IP protocol or KNX protocol.

In an embodiment, there is provided a ventilation system which is automatically configured to monitor air quality and air exchange and correspondingly adjust ventilation settings in real time. An air vent/valve in accordance with an embodiment or an additional part located therein comprises one or several sensors or detectors that have been adapted to analyze the amount and quality of the air current coming from the ventilation system and/or entering the ventilation system. The measurement results produced by sensors are delivered for analysis in a processing unit. The air vent or an additional part located therein may comprise, for example, a data transfer element, such as a radio unit through which the air vent sends the measurement results produced by the sensors to a processing unit.

The processing unit may be a part of the user's electronic terminal device or other analysis tool, which may be, for example, a computer, a smartphone, a smartwatch, a tablet computer or a server. The processing unit may be located in a building services center or in the ventilation unit. The processing unit may also be a part of the air vent or of an additional part located therein, and the air vent may be configured to automatically adjust the settings of the ventilation system (for example, the ventilation unit or other air vents in the ventilation system) on the basis of measurement results produced by sensors.

In an embodiment, there is provided an air vent which functions as a decorative part of the interior design of households, business premises, offices or other similar premises. The air vent may comprise, for example, a (possibly replaceable) decorative part or light fitting attachable to its outer surface. The decorative part or light fitting may be attached to the air vent by means of a magnet, for example, whereby the decorative part can easily be replaced. The decorative part or light fitting may comprise, for example, a LED (light emitting diode) or other lights or electronics, which the user may adjust or control through the user interface of the ventilation system. The user may, for example, adjust the color and/or brightness of the lighting. The user interface may be implemented in the user's electronic terminal device by means of an application, for example, or the user interface may be a part of the ventilation unit of the ventilation system.

In an embodiment, devices within the same building or within the same ventilation system may form a connection to each other and/or to a common database. The devices may save the detected and calculated data in a database where this data is available to other devices of the system. Correspondingly, the data in such a database is available to the user of the ventilation system, for example, through an application run in the user's electronic terminal device.

The intelligent air vent/valve in accordance with the different embodiments of the invention is intended for private and/or public use. The intelligent air vent/valve in accordance with different embodiments of the invention or an additional part located therein may be equipped with an external or internal power supply.

Figure 1:
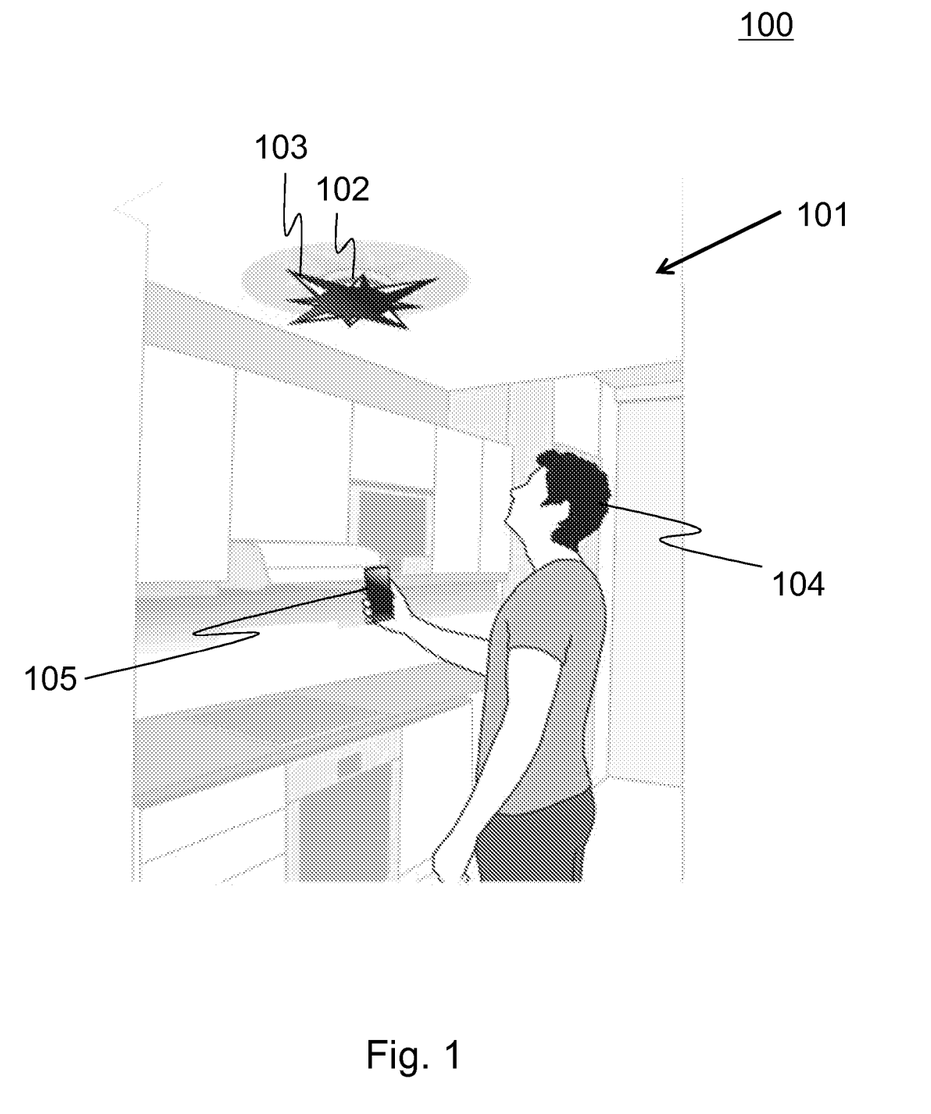
FIG. 1 shows a an operating environment in accordance with an embodiment of the invention.

FIG. 1 shows an operating environment 100 in accordance with an embodiment of the invention. FIG. 1 shows room 101 in the roof of which an air vent (a valve) 102 has been installed. A decorative part 103 has been attached to the air vent 102. In addition, FIG. 1 shows a user 104 of the ventilation system (for example, a mechanic of the ventilation system or the resident of the apartment in question or the user of the room in question). The user 104 has an electronic terminal device 105 (for example, a smartphone) through which (for example, through an application installed on the device) the user may monitor the operation of the ventilation system (or the air vent 102) and also adjust the operation of the ventilation system and/or the air vent 102.

Figure 2:
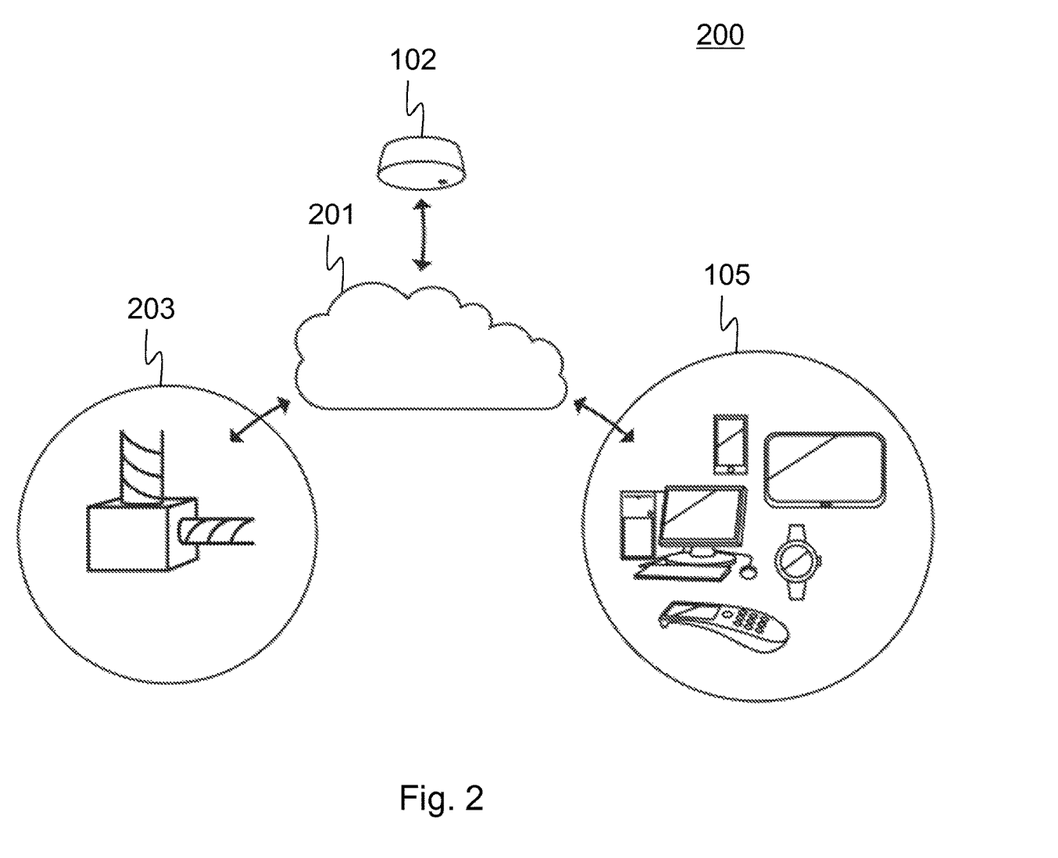
FIG. 2 shows a system in accordance with an embodiment of the invention.

FIG. 2 shows a system 200 in accordance with an embodiment of the invention. The system 200 comprises an air vent (a valve) 102, a ventilation unit 203 and an electronic terminal device 105. In addition, the system 200 comprises data transfer connections 201, through which the devices within the system may be connected to each other.

The air vent 102 is a device that lets air into the ventilation system/out of the ventilated space (air exhaust valve) and/or away from the ventilation system/into the ventilated space (an air intake valve). The air vent comprises one or several sensors measuring parameters related to the quality of air integrated into said air vent. These sensors may measure, for example, one or several of the following parameters: carbon dioxide ($CO_2$) content of the air, carbon monoxide content of the air, the temperature of the air, the amount of air current, air humidity, the number of mold spores, and the number of other fine particles. The sensors may be part of an additional part located in the air vent. The additional part may be a component that can be detachably assembled into the air vent (air intake valve or air exhaust valve). The ventilation unit 201 and the air vent 102 are connected to each other through ducts (not shown in the figure).

The electronic terminal device 105 may be, for example, a computer, smartphone, smartwatch, tablet computer or server. Data transfer connections 201 may be made up of various data transfer connections, which may be, for example, a short-range connection, such as Bluetooth, an infrared or NFC connection, or an information network, mobile data network or data cable connection. The data transfer connection may be a connection in accordance with the IP protocol or KNX protocol.

FIG. 2 shows, for the sake of simplicity, only one air vent, but in practical implementations there are typically several air vents. There may also be more than one electronic terminal device 105.

The operation of the different embodiments of the invention in the system of FIG. 2 or comparable has been explained in more detail in connection with FIG. 4, for example.

Figure 3:
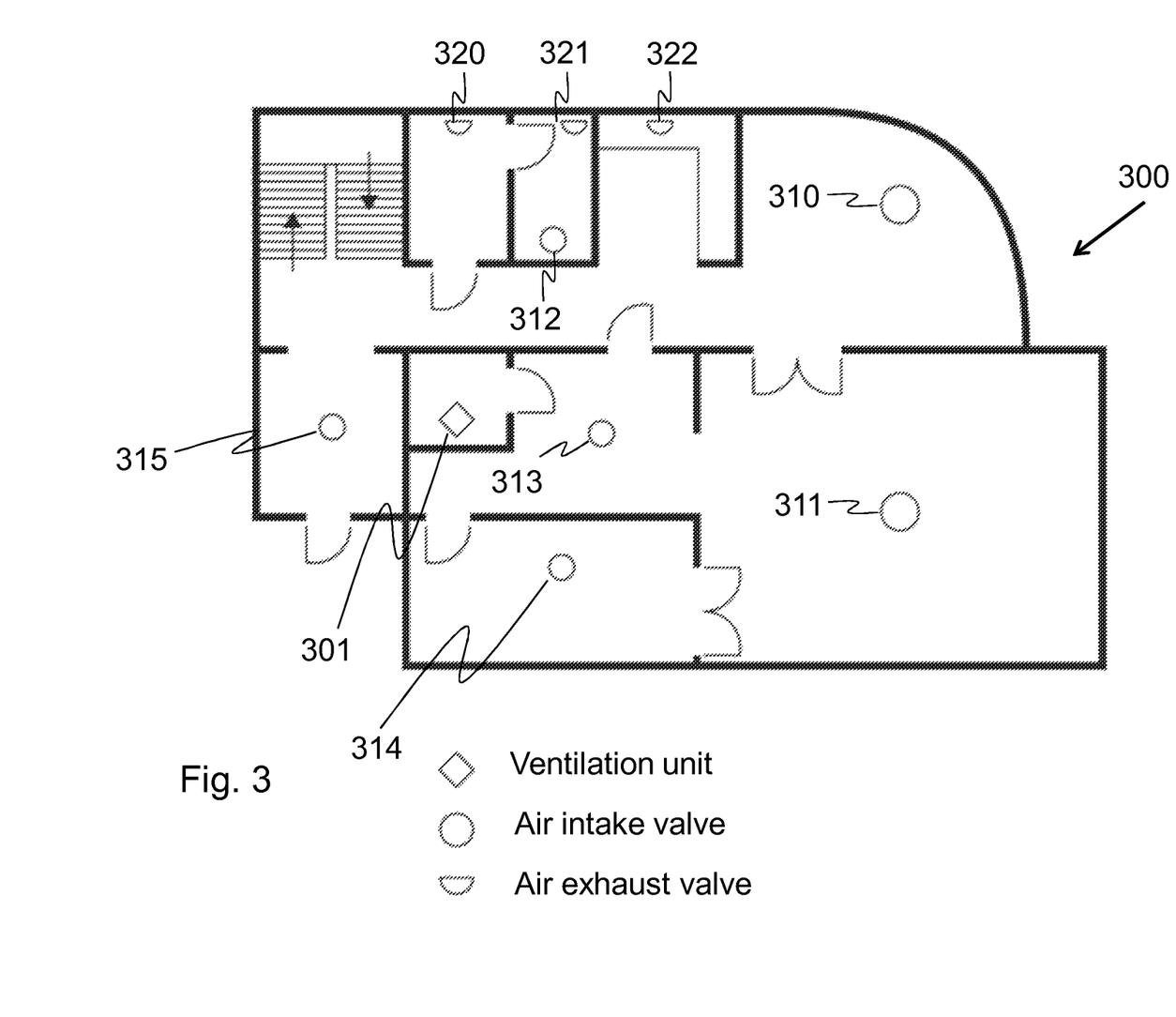
FIG. 3 shows a layout of a building where a method in accordance with an embodiment of the invention may be used.

FIG. 3 shows a layout 300 of a building where a method in accordance with an embodiment of the invention may be used. The layout 300 shows a ventilation system that comprises a ventilation unit 301, air intake valves 310-315 and air exhaust valves 320-322. The characteristics of the different embodiments of the invention may be implemented in one or several ventilation system elements 301, 310-315 and 320-322. In one example, sensors measuring parameters related to air quality have been integrated in one or several air intake valves 310-315 and/or air exhaust valves 320-322. The system adjusts the settings of the other elements of the system (one or several) on the basis of parameters measured by sensors in some of the valves 310-315 and 320-322.

Figure 4:
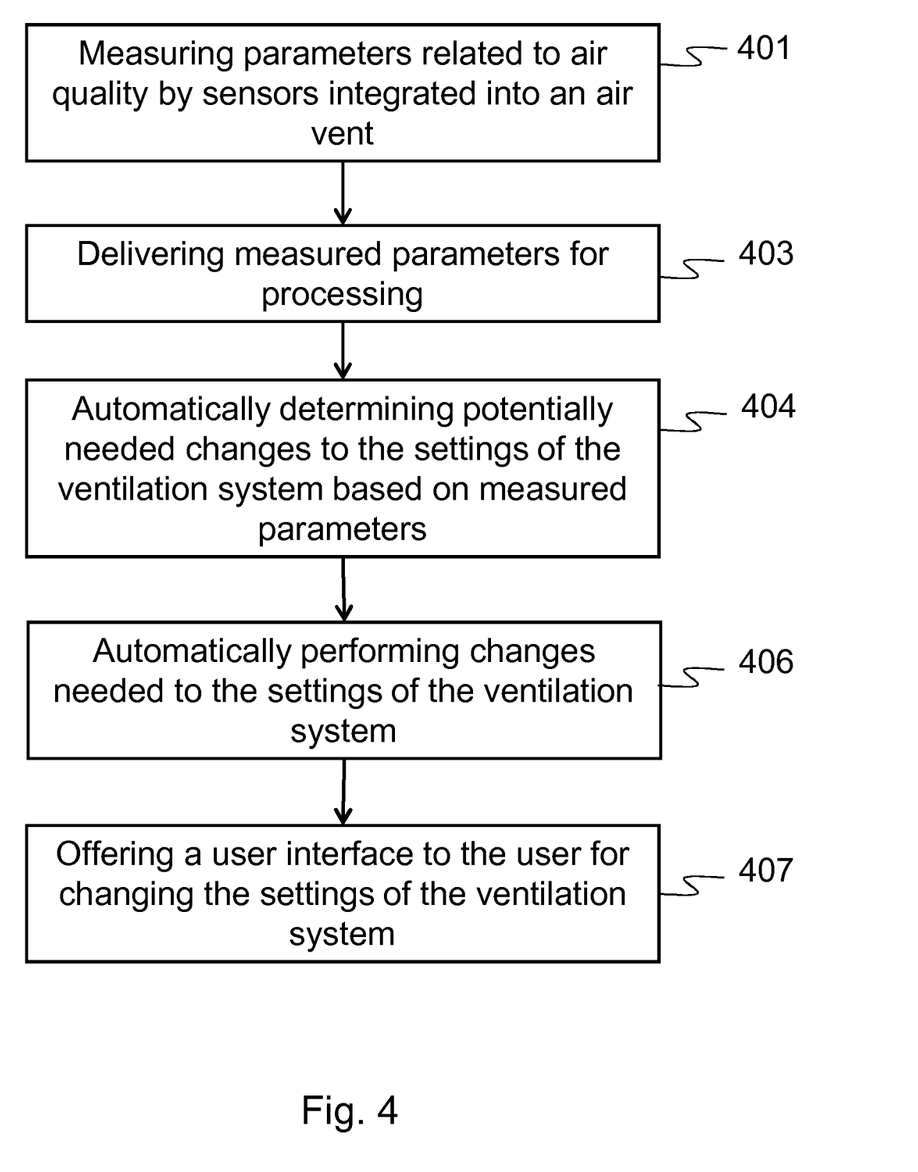
FIG. 4 shows a flow chart describing a method in accordance with an embodiment of the invention.

FIG. 4 shows flow chart describing a method in accordance with an embodiment of the invention. The method may be implemented, for example, in the air vent 102 of FIGS. 1 and 2 or in an additional part of an air vent located therein and possibly partly in electronic terminal devices 105 of FIGS. 1 and 2. Here it must be noted that all the steps presented in the figures are not necessarily obligatory and that the different steps may also be performed in an order that differs from the order presented in the figure.

The method comprises the following steps:
  401: Measuring parameters related to air quality by sensors located in air vents. The sensors may be, for example, part of the additional part of an air vent.

403: Delivering the measured parameters for processing. The measurement results are sent, for example, over a data transfer connection from the air vent to some other device for processing or are read into a processing unit located in the air vent or its additional part.

404: Automatically determining any changes potentially needed in the settings of the different elements of the ventilation system on the basis of measured parameters. This step may be performed in the air vent 102 or its additional part or, for example, in the user's electronic terminal device 105 or a server or computer connected to a data transfer network.

406: Automatically performing the changes needed in the settings of the ventilation system. At this step, it is possible, for example, to control the ventilation unit to increase or decrease the amount of ventilation through a data transfer interface. Alternatively or additionally, it is possible to adjust individual air vents belonging to the ventilation system. In an example, the ventilation of one room/space is improved by reducing the air gap of the air vent in other rooms/spaces and increasing the air gap of the air vent in the increasingly ventilated space. The air gap of the air vent may be adjusted, for example, by a motorized adjustment plate. This example is well suited, for example, for improving the ventilation of a bedroom during the night. This also allows saving energy, because it is not necessary to increase the efficiency of the operation of the ventilation unit. That is, it is possible to increase air intake/ventilation in one space by reducing air intake in some other space thereby not requiring/without making any changes in operation of the ventilation unit.

407: Providing the user with a user interface for changing the settings of the ventilation system. The interface may be implemented, for example, in the form of an application in the user's electronic terminal device 105.

In an example implementation, at step 404, measured parameters are compared to predefined reference values. Such reference values may be, for example, saved in a database, from which a processing unit performing the analysis of the measured parameters may retrieve the necessary reference values. If the measured parameters exceed or are lower than the reference values, the changes needed will be made to the settings of one or several elements of the ventilation system. The database may also comprise the recommended settings related to the reference values for the different elements of the ventilation system, i.e. the changes to be made may be received from the aforementioned database. As stated above, the change may be, for example, a change in the air gap of one or several air vents and/or a change in the operation of the ventilation unit.

The reference values may be tied to some time value so that at a certain time of day reference values different from some other time of day are applied. For example, during the day and night, different values may be applied. It is also possible to apply different values on different weekdays. In addition, the reference values may be facility-specific, so that in different facilities within the scope of the same ventilation system different reference values are applied.

A suitable margin may be taken into account in the comparison of reference values and measured parameters, whereby the system need not be adjusted immediately when the measured values differ slightly from the given reference values, but only after detecting a more significant difference. This allows avoiding any unnecessary adjustment of the system.

In an embodiment, the aforementioned reference values may be changed by an intelligent device connected to the system. In this manner, the operation of the ventilation system may be changed easily.

The method shown in FIG. 4 is performed continuously and in real time, whereby the operation of the ventilation system is continuously analyzed and the operation of the system is adjusted according to need, whereby it is possible to maintain the best possible air quality.

In an embodiment one air vent of a ventilation system may be a master unit, while other air vents are slave units. The slave units are configured to send their measurement results to the master unit. The master unit comprises a processing unit that is configured to process the measurement results received from various air vents and to automatically determine settings for different elements (e.g. air vents and/or ventilation unit) of the ventilation system and to control the different elements to take the setting determined into use.

Figure 5:
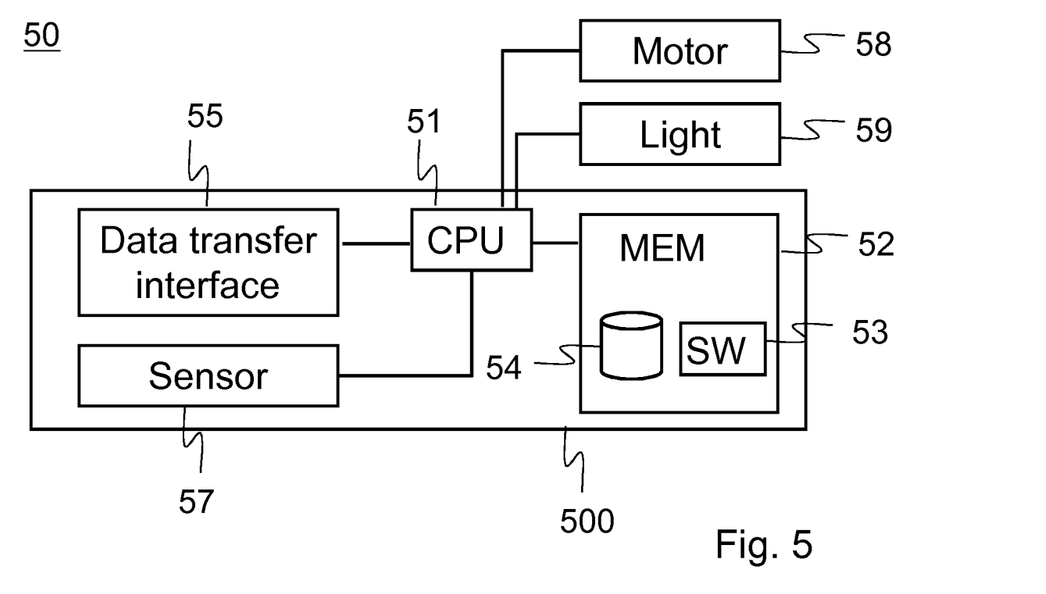
FIG. 5 shows a block diagram of a device in accordance with an embodiment of the invention.

FIG. 5 shows a block diagram of a device 50 in accordance with an embodiment of the invention. The device 50 may be, for example, the air vent of FIGS. 1 and 2. The device 50 comprises an additional part or an intelligent component 500. The additional part 500 may be adapted to perform the method presented in FIG. 4 or part of it.

The additional part 500 comprises a processor 51 for controlling the operation of the additional part and a memory 52 which comprises a computer program/software 53 and potentially also a database 54. The computer software 53 may comprise instructions for the processor to control the additional part 500, such as an operating system and various applications, for example. Furthermore, the computer software 53 may comprise an application that comprises instructions for controlling the additional part 500 and the device 50 so that the functionality in accordance with an embodiment of the invention is produced. The processor 51 may be, for example, a central processing unit (CPU) of a computer or a microprocessor.

The additional part 500 comprises one or several sensors 57 measuring parameters related to the quality of air. The sensor 57 is adapted to feed the measurement results for processing by the processor 51. The database 54 may comprise examples of ventilation system settings suitable for certain parameter values produced by the sensor 57.

In addition, the additional part 500 comprises a data transfer interface 55 for communication with other devices. The interface may be a fixed, wired connection, such as an Ethernet connection or ADSL/VDSL connection, or a wireless connection, such as a WLAN, Bluetooth, NFC, infrared, GSM/GPRS, CDMA, WCDMA or LTE connection. The additional part 50 also comprises a power supply, such as, for example, a battery or portable battery or a connection to the electrical network.

The device 50 may also comprise a motor 58, which may be used to adjust the amount of ventilation (e.g. the size of the air gap) in the device 50, and/or a light fitting 59. The processor 51 of the additional part 500 may be configured to control the operation of the motor 58 and/or the light fitting 59 on the basis of the measurement results of the sensor 57 or on the basis of information received through the data transfer interface 55.

Figure 6:
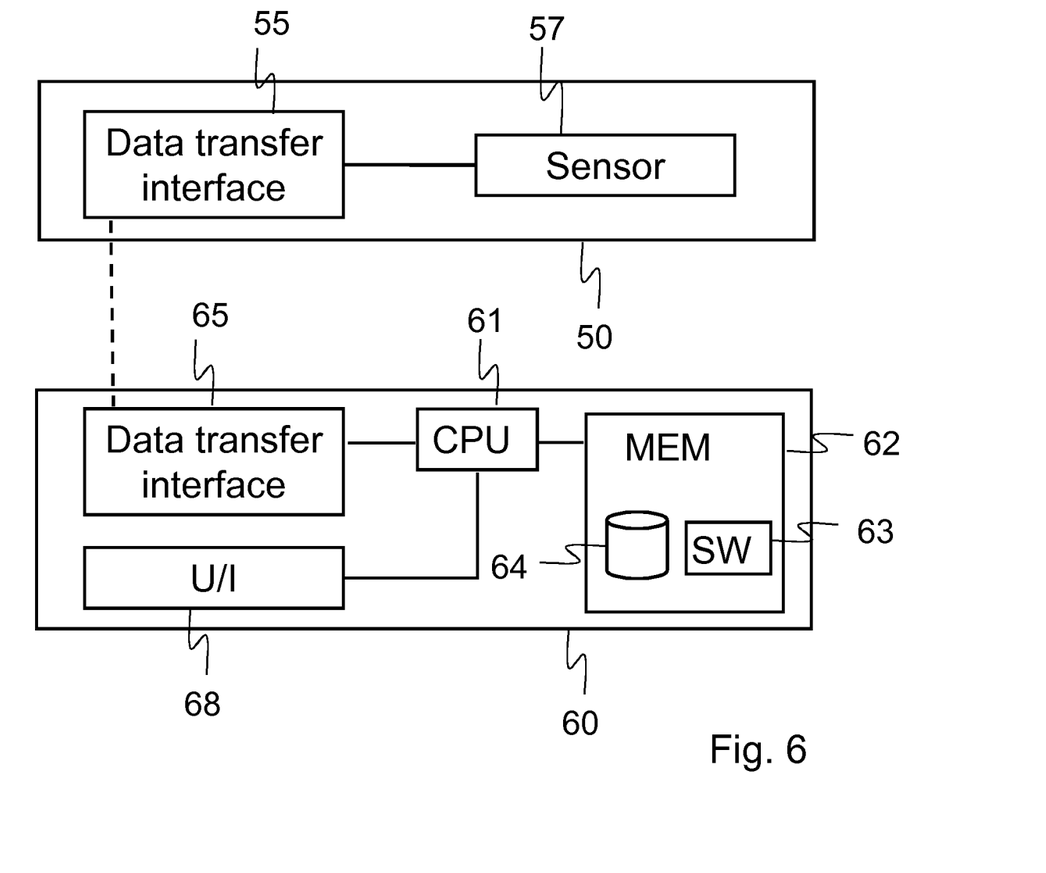
FIG. 6 shows a block diagram of devices in accordance with an embodiment of the invention.

FIG. 6 shows devices 50 and 60 as a block diagram in accordance with an embodiment of the invention. The device 50 may be, for example, an additional part included in the air vent 102 of FIGS. 1 and 2, and the device 60 may be, for example, the electronic terminal device 105 of FIGS.

1 and 2. The devices 50 and 60 may together be adapted to perform the method presented in FIG. 4 or a part thereof.

The device 50 comprises one or several sensors 57 measuring parameters related to air quality and a data transfer interface 55 for communicating with other equipment. The interface may be a fixed, wired connection, such as an Ethernet connection or ADSL/VDSL connection, or a wireless connection, such as a WLAN, Bluetooth, NFC, infrared, GSM/GPRS, CDMA, WCDMA or LTE connection.

A sensor 57 is adapted to feed the measurement results through the data transfer interface 55 for processing in the device 60.

The device 60 comprises a processor 61 for controlling the operation of the device and a memory 62 comprising a computer program/software 63. The computer software 63 may comprise instructions for the processor to control the device 60, such as an operating system and various applications. Furthermore, the computer software 63 may comprise an application that comprises instructions for controlling the device 60 so that functionality in accordance with an embodiment of the invention is produced. The processor 61 may be, for example, a central processing unit (CPU) of a computer or a microprocessor.

In addition, the device 60 comprises a data transfer interface 65 for communicating with other devices and, for example, receiving measurement results from the device 50. The interface may be a fixed, wired connection, such as an Ethernet connection or ADSL/VDSL connection, or a wireless connection, such as a WLAN, Bluetooth, NFC, infrared, GSM/GPRS, CDMA, WCDMA or LTE connection.

The database 64 may comprise examples of ventilation system settings suitable for certain parameter values produced by the sensor 57.

The device 60 comprises a user interface unit (U/I) 68 for receiving a feed from the user and providing printouts to the user, which may comprise a display and a keyboard, for example (not shown in the figure), and may be an integrated part of the device 60.

In addition to the elements presented in FIGS. 5 and 6, the devices 50 and 60 may also comprise other elements.

In the following, example cases related to the different embodiments of the present disclosure are presented.

Energy Efficiency and Achieving Appropriate Ventilation

If a room (or other space) is empty, the amount of ventilation may be reduced considerably, because in such cases the air quality does not deteriorate as soon as in a situation where there are a lot of people or animals in the room. In an embodiment, the air vent comprises a sensor that measures the amount of carbon dioxide ($CO_2$) in indoor air. If the measurement results provided by the sensor indicate a low amount of carbon dioxide (the amount of carbon dioxide is lower than a previously set limit value, for example), the processing unit of an intelligent ventilation system may deduce that the room is likely to be empty and that the amount or ventilation may be reduced. On this basis, the processing unit may automatically adjust the ventilation unit to reduce the amount of ventilation in the room in question. This allows savings energy, for example. Correspondingly, if the measurement results provided by the sensor indicate a high amount of carbon dioxide (the amount of carbon dioxide exceeds a previously set limit value, for example), the processing unit of an intelligent ventilation system may deduce that it is likely that there are several people (or animals) in the room and that the amount or ventilation should be increased. On this basis, the processing unit may automatically control the ventilation unit to increase the amount of ventilation in the room in question and/or adjust the ventilation valves/air vents in the room in question, as necessary.

In certain embodiment, a sensor of an air exhaust valve measures the amount of carbon dioxide ($CO_2$) in air that exits the ventilated space and a processing unit of the intelligent ventilation system uses measurement results of the carbon dioxide sensor to determine settings for air intake valves and air exhaust valves of the ventilated space. In an embodiment the processing unit of the intelligent ventilation system uses the measurement results of the carbon dioxide sensor(s) to determine whether certain space is occupied and whether the space is e.g. fully occupied or partly occupied and determines the settings for the air vents based on whether the space is occupied.

Various embodiments are particularly well suited for use in cruise ships or other environments where usage of the space depends on the time of the day e.g. so that some parts are mostly used during day time and some other parts during evenings/nights. In an example embodiment different spaces of the ventilated system are designed so that the same ventilation unit serves spaces that are mainly used at different times. For example a café or a conference space on a cruise ship may be mainly used in the mornings and during daytime while a nightclub is mainly used in the evenings and nights. Now, if the air vents of the café and the nightclub are equipped with additional parts according to embodiment of the invention, the measurements made in the air vents by the sensors of the additional parts automatically cause that the air vents of these spaces are controlled to guide more air to the space that is occupied while decreasing the air flow to the space that is not occupied (or is less occupied). In an embodiment the carbon dioxide measurements are used for determining whether a space is occupied and air vents are controlled on the basis of measured carbon dioxide levels. However, also some other measurement results may be used. As the same ventilation unit serves both of the spaces, changes in the ventilation unit are not necessarily needed. Instead the intelligent air vents automatically guide the airflow produced by the ventilation unit to the space where air is needed. The same principle applies to ventilation of ship cabins, where ventilation requirements are likely to be low during daytime, while more ventilation is needed during nighttime. The airflow that is guided to the cabins during nighttime may be guided to public spaces of the ship during daytime. In this way one may achieve energy savings in the ship. As the airflow produced by the ventilation units is intelligently guided to the spaces where it is needed, less ventilation units may be needed whereby less fuel may be needed to operate the ship. This type of intelligent control of airflow produced by the ventilation units is particularly suited for sips also because the number of people is a ship remains substantially the same at least when the ship is sailing. Therefore the amount of required air and produced airflow may remain the same in the overall system and the intelligent control system then guides the produced air flow to the spaces where it is needed.

Safety (Disruption in Air Quality)

The ventilation system in accordance with an embodiment of the present disclosure also recognizes other matters related to air quality in addition to the carbon dioxide content. The system may, for example, recognize the existence and amount of particles of a certain type in indoor air. Such particles include, for example, carbon monoxide and mold spores. After detecting carbon monoxide, mold spores or other particles dangerous to human health, the system may, for example, immediately inform the user of its findings by intelligent devices and other known warning systems connected to the system (a sound signal). The system may also instruct the user/resident to inform the property manager of the housing company. If the system is also connected to the information systems of the party acting as the property manager, an indication of the dangerous findings in the indoor air of the apartment is also automatically passed to the property manager, whereby the user/resident also receives information on this. Correspondingly, the system may automatically perform the changes needed in the settings of the ventilation system.

An air vent in accordance with certain embodiments may help prevent extensive fires. If a fire begins below or in the vicinity of an air exhaust valve, the fire may develop to be difficult to extinguish before the fire alarm possibly located on the premises informs about the fire. Intelligent air vent in accordance with an embodiment will detect fine particles caused by a starting fire in the indoor air and on this basis automatically close the ventilation and the ducts, reducing in this way the uncontrolled expansion of the fire. The air vent may additionally be configured to send an alarm about a detected fire to a user/resident or another party.

In an embodiment, the air vent comprises an ultraviolet light source. It is possible to kill bacteria in the air by means of a UVC light. This embodiment may be used in hospitals, for example. In an embodiment, a UVC light in the air vent may be switched to the "ON" state through a user interface located in an intelligent device connected to the ventilation system. In an embodiment, the UVC light is directed at the ducts, whereby any bacteria may be eliminated even before they access the indoor air. In an embodiment, the UVC light is automatically switched to the "ON" state, as necessary, as a response to the measurement results of the sensors in the air vent. The UVC light may be switched automatically to the "ON" state, for example, when a sensor detects bacteria or other harmful fine particles in the air intake. In an embodiment, the UVC light or another light source in the air vent will be automatically switched to the "OFF" state, if the carbon dioxide sensor indicates that there are no people on the premises. Correspondingly, the UVC light (or other light source) may be automatically switched to the "ON" state if the carbon dioxide sensor indicates that there are people on the premises. This allows saving energy and improving the user experience.

Convenience, Simplicity and Efficiency

Mechanic's Point of View

In accordance with an embodiment, the mechanic of a ventilation system most simply installs an air vent at the end of a ventilation pipe by using known fastening methods. The mechanic also connects the intelligent air vent/valve to the electrical network of the building. After this, the mechanic is able to detect, adjust, and monitor the ventilation directly from an intelligent device connected to the system.

User's Point of View

A user/resident of a building connects their computer and/or another known intelligent device, such as a watch, telephone, tablet or intelligent eyeglasses to the system by installing a certain application on their device, and immediately afterwards gains access to all the benefits of the system.

Administrator's/Service Organization's Point of View

The administrator/service organization responsible for the property connects its own computers and/or other known intelligent devices to the ventilation systems installed in the property using known data transfer methods. The administrator/service party gains thereby access to all the information which the system detects to monitor and adjust the ventilation and air exchange. This facilitates and enhances the operation of the administrator/service party in the property. The cleaning of the ducts is also easy, because the ducts do not include additional sensors that make cleaning more difficult.

One of the effects gained by certain embodiments of the present disclosure is the opportunity to adjust ventilation automatically, in a situation-specific manner and/or in real time. There may occur problems in ventilation systems in accordance with prior art if some premises are taken into use that differs from the original purpose of use. Then the ventilation of the premises does not necessarily correspond to the needs of the new purpose of use. By means of certain embodiments of the invention, such a situation may be easily resolved by determining new reference values for the ventilation system, on which the adjustment of the system is based. After this, the system will be automatically adjusted for the needs of the new purpose. In this way, spaces and rooms may be provided with individual adjustment opportunities according to changing needs.

In an embodiment, the mechanic may adjust the settings of all air vents/valves of a property at once.

In an embodiment, the administrator and user may see the air quality and air exchange of a property in real time and may also adjust it remotely.

In an embodiment, the system is able to inform the user and administrator of air quality and air exchange in a property in real time.

One of the effects achieved by certain embodiments of the present disclosure is the opportunity to locate ducts in a new way, in the most central locations, for example.

In an embodiment, where a separately installable and possibly replaceable decorative part is attached to the air vent, the air vents which in previous solutions are garishly distinguished from the roof and walls may be decorated in a manner suited to the premises.

In an embodiment, the decorative part also functions as a light fitting. In an embodiment, the color and brightness of such a light fitting may be changed from an electronic terminal device in connection with the ventilation system, which improves the user experience and increases the user's freedom to operate. A decorative part or another part to be attached to the air vent may also comprise an emergency light fitting, which is mandatory in every cabin on ships, for example.

In an embodiment, it is possible to replace the decorative part of the air vent, as desired, without any major or difficult measures.

One of the effects achieved by certain embodiments of the invention is the opportunity to protect the health of people staying/living on private or public premises by sensing the air quality passing through the air vent and as necessary warning the people staying/living on the premises of any possible problem situations. In an embodiment, the ventilation system is adjusted automatically so that attempts are made to minimize the deterioration of air quality and/or potential detrimental effects of poor air quality are sought to be minimized.

The description presented in the foregoing provides non-limiting examples of certain embodiments of the present disclosure. It is apparent to those skilled in the art that the disclosed embodiments are not confined to the details presented above, but that the disclosed embodiments may also be implemented in other equivalent ways. For example, it is to be appreciated that, in the above methods, the order of the individual steps of the method may be changed and some steps may be repeated several times or omitted altogether. It is also to be appreciated that the terms 'comprise' and 'include' as used in this document are open-ended expressions and not intended to be limiting.

In addition, certain features of the disclosed embodiments may be utilized without employing other features. The above description must be regarded as an explanation describing the principles of the disclosed embodiments and not as limiting the present disclosure. The scope of the present disclosure is only limited by the appended claims.

The invention claimed is:

1. An air vent, which air vent is an air exhaust valve of a ventilation system, the ventilation system comprising the air exhaust valve and a number of other elements, wherein the air exhaust valve lets air into the ventilation system, the air vent comprising an additional part, wherein said additional part comprises:
   a sensor configured to measure a carbon dioxide content of air existing a ventilated space,
   a data transfer interface to implement data transfer between said additional part and the other elements of said ventilation system, and
   a processing unit which is configured to automatically determine changes needed in settings of said air exhaust valve and said other elements of the ventilation system on the basis of the carbon dioxide content measured by said sensor and send information on said changes needed in settings of one or more of the other elements of said ventilation system through said data transfer interface.

2. An air vent in accordance with claim 1, wherein the additional part further comprises at least another sensor configured to measure parameters related to quality of the air exiting Hail the ventilated space.

3. An air vent in accordance with claim 1, wherein the processing unit is configured to determine, on the basis of the measured carbon dioxide content of the air exiting the ventilated space, changes needed in air intake valves of the ventilated space.

4. An air vent in accordance with claim 1, wherein the processing unit is configured to determine, on the basis of the measured carbon dioxide content of the air exiting the ventilated space, changes needed in air intake valves of the ventilated space.

5. An air vent in accordance with claim 1, wherein the processing unit is configured to determine, on the basis of the measured carbon dioxide content of the air exiting the ventilated space, changes needed in air intake valves of the ventilated space and changes needed in air intake valves of other ventilated spaces, thereby enabling changes in ventilation of said ventilation system without making changes in a ventilation unit of said ventilation system.

6. An air vent in accordance with claim 1, wherein the determined changes comprise changes to settings of a ventilation unit belonging to the ventilation system.

7. An air vent in accordance with claim 1, wherein the determined changes comprise changes to settings of other air vents belonging to the ventilation system.

8. An air vent in accordance with claim 1, wherein said processing unit is configured to automatically determine changes needed in the settings of said air vent on the basis of the carbon dioxide content measured by said sensor and carry out the determined changes in the settings of said air vent.

9. An air vent in accordance with claim 1, wherein said processing unit is configured to receive setting information through said data transfer interface for said air vent and change the settings of said air vent on the basis of said received setting information.

10. An air vent in accordance with claim 2, wherein the at least another sensor comprises a sensor configured to measure a fine particle content of the air.

11. An air vent in accordance with claim 1, wherein said air vent comprises a light fitting to be attached to an outer surface of the air vent and that said processing unit is configured to receive setting information through said data transfer interface for said light fitting and control said light fitting on the basis of said received setting information.

12. An air vent in accordance with claim 1, wherein said additional part is configured to be detachably attached to said air vent.

13. An air vent in accordance with claim 1, wherein said air vent comprises a decorative part attached to an outer surface of the air vent.

14. A ventilation system comprising:
   air intake valves;
   air exhaust valves;
   a sensor located in one of the air exhaust valves and configured to measure a carbon dioxide content of air exiting a ventilated space; and
   a processing unit configured to automatically determine changes needed in settings of the air intake valves of the ventilation system on the basis of the carbon dioxide content measured by the sensor and automatically control operation of said ventilation system to introduce said changes needed.

15. A ventilation system in accordance with claim 14, wherein the process unit is configured to automatically determine changes needed in setting of the air exhaust valves.

16. A ventilation system in accordance with claim 14, wherein said processing unit is configured to provide a user with a user interface through which the user may in a centralized manner change settings of different elements of said ventilation system.

17. A method for a ventilation system, the ventilation system comprising an air exhaust valve and a number of other elements, the method comprising:
   measuring a carbon dioxide content by a sensor located in the air exhaust valve, thereby measuring the carbon dioxide content of air exiting a ventilated space,
   automatically determining changes needed in settings of the other elements of said ventilation system on the basis of the carbon dioxide content measured by said sensor, and
   automatically introducing said changes needed in the other elements of said ventilation system.

18. A method in accordance with claim 17, further comprising automatically determining, on the basis of the measured carbon dioxide content of the air exiting the ventilated space, changes needed in air intake valves of the ventilated space.

19. A method in accordance with claim 17, further comprising automatically determining, on the basis of the measured carbon dioxide content of the air exiting the ventilated space, changes needed in settings of air intake valves of said ventilated space and changes needed in settings of air intake valves of other ventilated spaces, thereby enabling changes in ventilation of said ventilation system without making changes in a ventilation unit of said ventilation system.

* * * * *